US 11,249,050 B2

(12) United States Patent
Palladino et al.

(10) Patent No.: US 11,249,050 B2
(45) Date of Patent: Feb. 15, 2022

(54) DEVICE AND METHOD FOR DETECTING FAULTS OF A STRUCTURE

(71) Applicant: SAFRAN, Paris (FR)

(72) Inventors: Luca Palladino, Moissy-Cramayel (FR); Sabri Janfaoui, Moissy-Cramayel (FR)

(73) Assignees: SAFRAN, Paris (FR); COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 127 days.

(21) Appl. No.: 16/755,362

(22) PCT Filed: Oct. 11, 2018

(86) PCT No.: PCT/FR2018/052530
§ 371 (c)(1),
(2) Date: Apr. 10, 2020

(87) PCT Pub. No.: WO2019/073179
PCT Pub. Date: Apr. 18, 2019

(65) Prior Publication Data
US 2021/0199621 A1 Jul. 1, 2021

(30) Foreign Application Priority Data

Oct. 12, 2017 (FR) .......................... 1759562
Feb. 20, 2018 (FR) .......................... 1851433

(51) Int. Cl.
G01N 29/04 (2006.01)
G01N 29/24 (2006.01)

(52) U.S. Cl.
CPC ......... G01N 29/04 (2013.01); G01N 29/2437 (2013.01); G01N 29/2475 (2013.01);
(Continued)

(58) Field of Classification Search
CPC ............... G01N 29/2475; G01N 29/04; G01N 29/2437; G01N 2291/105; G01N 2291/023; G01N 2291/0289
(Continued)

(56) References Cited

U.S. PATENT DOCUMENTS 4,893,025 A 1/1990 Lee
7,647,206 B2 1/2010 Ford
(Continued)

FOREIGN PATENT DOCUMENTS

FR 2 262 303 A1 9/1975

OTHER PUBLICATIONS

D. A. Tibaduiza et al., "Damage classification in structural health monitoring using principal component analysis and self-organizing maps", Structural Control and Health Monitoring, 2013, pp. 1303-1316, vol. 20, No. 10, XP55480054, DOI: 10.1002/stc.1540, ISSN:1545-2255.
(Continued)

Primary Examiner — Jacques M Saint Surin
(74) Attorney, Agent, or Firm — Sughrue Mion, PLLC

(57) ABSTRACT

The invention relates to a device for detecting faults of a structure (STR), the device comprising a calculation unit and a plurality of transducers (100) intended to be positioned on or in the structure (STR),
first transducers (E) of the plurality de transducers (100) being capable of being in an emission mode,
second transducers (R) of the plurality of transducers (100) being capable of being in a reception mode,
characterized in that the first transducers (E) form a hexagonal meshing so as to delimit between them several mutually adjacent mesh cells, the second transducers (R) being positioned on respective emission circles of the first
(Continued)

transducers (E), each emission circle of a first transducer (E) being centered on the first transducer (E).

14 Claims, 6 Drawing Sheets

(52) U.S. Cl.
CPC ............ *G01N 2291/023* (2013.01); *G01N 2291/0289* (2013.01); *G01N 2291/105* (2013.01)

(58) Field of Classification Search
USPC .......................................................... 73/632
See application file for complete search history.

(56) References Cited

U.S. PATENT DOCUMENTS

| | | | |
|---|---|---|---|
| 7,937,248 | B2 | 5/2011 | Ihn et al. |
| 8,707,787 | B1 | 4/2014 | Sohn et al. |
| 10,324,065 | B2* | 6/2019 | Lee ................ A61B 8/485 |
| 2005/0094490 | A1 | 5/2005 | Thomenius et al. |
| 2006/0164919 | A1 | 7/2006 | Watanabe et al. |
| 2006/0287842 | A1 | 12/2006 | Kim |
| 2007/0266790 | A1* | 11/2007 | Gunasekaran ....... G01N 29/265 73/624 |
| 2009/0099790 | A1* | 4/2009 | Pado ................ G01N 29/4481 702/35 |
| 2009/0192727 | A1 | 7/2009 | Ford |
| 2012/0059600 | A1* | 3/2012 | Xiang ................ G01N 29/348 702/39 |
| 2014/0123758 | A1 | 5/2014 | Gebski et al. |
| 2015/0212048 | A1* | 7/2015 | Ganesan ............. G01N 29/069 73/632 |
| 2015/0308920 | A1 | 10/2015 | Sandera et al. |

OTHER PUBLICATIONS

Diego A Tibaduiza et al., "Structural damage detection using principal component analysis and damage indices", Journal of Intelligent Material Systems and Structures, Apr. 13, 2015, pp. 1-16.
J. Dziewierz et al., "A 2D Ultrasonic Array design incorporating Hexagonal-shaped Elements and Triangular-cut Piezocomposite Substructure for NDE applications", Ultrasonics Symposium (IUS), 2009 IEEE International, IEEE, Piscataway, NJ, USA, Sep. 20, 2009 (Sep. 20, 2009), pp. 422-425, XP031654353, ISBN: 978-1-4244-4389-5XP; XP031654353 (Cat. A).
Preliminary Search Report for corresponding FR 1 759 562, dated May 31, 2018.
International Search Report for PCT/FR2018/052530, dated Jan. 22, 2019.

* cited by examiner

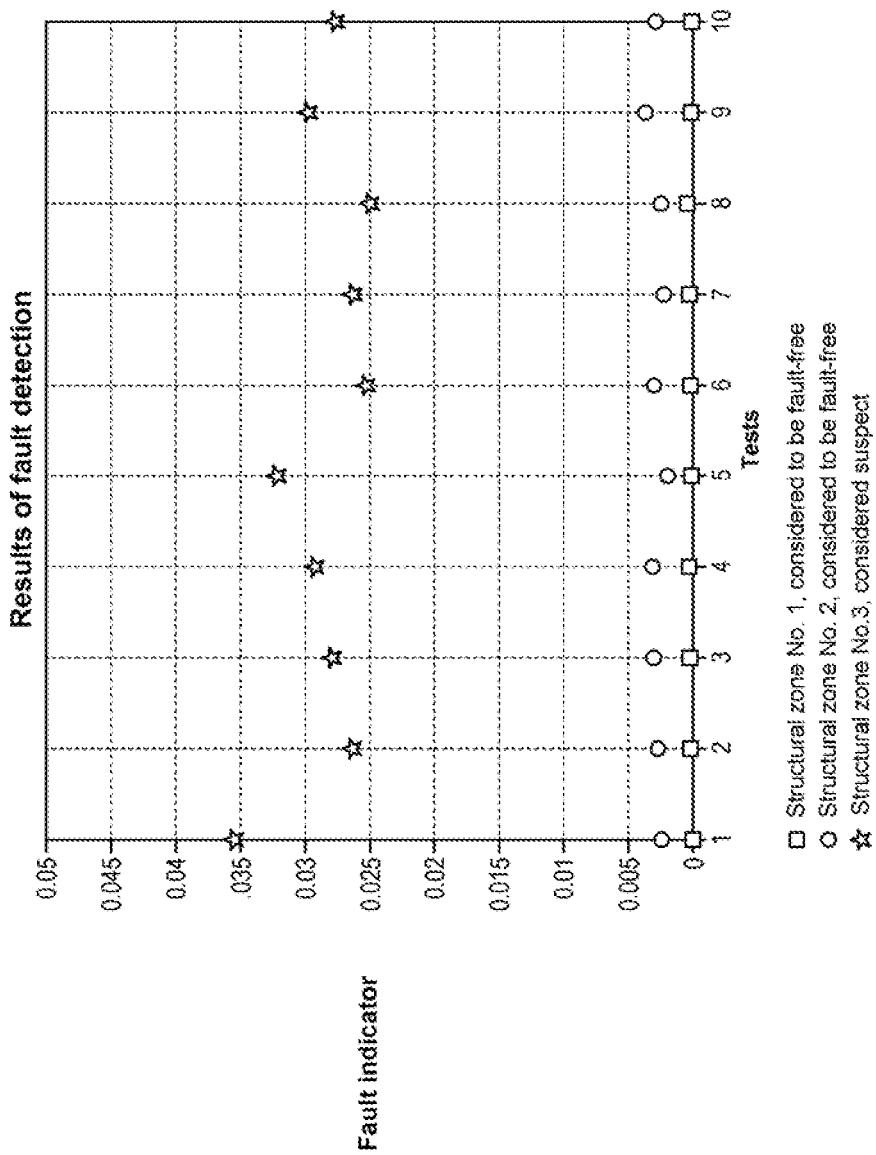

DEVICE AND METHOD FOR DETECTING FAULTS OF A STRUCTURE

CROSS REFERENCE TO RELATED APPLICATIONS

This application is a National Stage of International Application No. PCT/FR2018/052530 filed Oct. 11, 2018, claiming priority to French Patent Application No. 1759562 filed Oct. 12, 2017 and French Patent Application No. 1851433 filed Feb. 20, 2018, the entire contents of each of which are herein incorporated by reference in their entireties.

TECHNICAL FIELD

The invention relates to a device and a method for detecting faults of a structure.
A field of application of the invention relates to structures used in the field of aeronautics.

PRIOR ART

Devices for detecting faults in structures are known, for example from documents U.S. Pat. No. 7,937,248 and US 2015/0308920.

The principal objective of airline companies is to provide regular and prompt flights at competitive prices, so as to perform well with respect to their competitors. For this reason, they pay attention to the costs of maintaining their equipment and seek to work with component suppliers who are aware of the issue of availability and maintainability of a product during its life cycle.

Today, most purely structural elements of aircraft are inspected only during periodic maintenance to which said aircraft are subjected (typically type C inspections, or "C-checks"), for example every 24 months, or every 10,000 flight hours. More precisely, the maintenance of the type IFS structure ("internal fixed structure") of a thrust reverser (nacelle) of an aircraft is currently inspected by an operator who does not have decision support tools available.

Two improvement targets are sought: the first is connected with safety and the second is connected to economic aspects.

The fact that verification of structural integrity is accomplished only during periodical maintenance and by an unassisted human operator, leaves the door open to the possibility of flying with a system not having 100% of its integrity. Here the safety aspect requires that the structural system be replaced just prior to loss of integrity, which implies the need to further extend preventive maintenance.

Replacement of components during type C inspection also has two major disadvantages: on the one hand, the systems are often replaced preventively, when they are still capable of flight; on the other hand, they are often over-dimensioned, to tolerate the intended maintenance intervals without degrading safety. For this reason, there is a cost for the operator which could be avoided, or at least reduced significantly.

It is desired to follow continuously and/or periodically the evolution in the state of health of aeronautical structures. The objective is to resolve the problems previously mentioned and at the same time to space out, to simplify, even to reorganize maintenance operations.

Structural condition diagnostic systems are known, also called SHM (for "structural health monitoring") systems. An SHM system consists essentially of a non-destructive monitoring system which permanently integrates sensors. The data collected allow detecting the appearance, and following the evolution of damage/faults in the structure. Ideally, the SHM system should be able to:
  (i) detect the presence of a fault,
  (ii) locate it,
  (iii) determine its size, and
  (iv) provide a prognosis regarding the lifetime of the structure.

The economic issues are, firstly, to reduce the downtime of the aircraft, because repairs can be predicted or the diagnostics automated. Secondly, the issue is to replace only structures and components really needing replacement, and consequently to have fewer elements to replace, and therefore to produce.

The instrumentation of the structure allows obtaining measurements, for example measurements of acoustic or guided waves (for example Lamb waves) which must be processed and analyzed so as to define whether the structure has a fault or not.

According to some prior art, the analysis is accomplished today by comparing measurements taken on the structure to be analyzed (called the sample under analysis) to those which are taken on a reference structure (called a reference sample), which is by definition in a healthy condition.

The measurements that are carried out on the reference structures are often taken under well-defined reference thermal conditions, This choice involves a constraint, which is that measurements on the structure to be analyzed cannot be accomplished before it has reached a thermal condition identical to the reference state in which the measurements on the reference structure were carried out.

This difficulty implies costs connected with delays in analysis and therefor delays in the availability of the aircraft.

SUMMARY OF THE INVENTION

The invention aims to obtain a method and device for detecting faults of a structure, particularly an aeronautical structure, allowing an evaluation of the faults to be achieved without referring to the reference condition, but which is based only on information available to him (on the current condition) to identify the presence of a fault.

To this end, a first subject matter of the invention is a detection device for detecting faults of a structure, the device comprising a calculation unit and a plurality of transducers intended to be positioned on or in the structure,
  first transducers of the plurality of transducers being capable of being in an emission mode where they emit an excitation signal,
  second transducers of the plurality of transducers being capable of being in a reception mode where they receive a reception signal in response to the excitation signal emitted by a first transducer in the emission mode, the excitation signals and the reception signals being capable of propagating along the structure or in the structure,
characterized in that the first transducers form a hexagonal meshing so as to delimit between them several mutually adjacent mesh cells, the second transducers being positioned on respective emission circles of the first transducers, each emission circle of a first transducer being centered on the first transducer.

The device according to the invention can also comprise the following features, taken alone or in combination:
  the first transducers are piezoelectric sensors, and the second transducers each comprise a Bragg grating of an optical fiber, the mesh cells are equilateral triangles of which each vertex corresponds to the position of a first transducer, wherein a distance separating two first transducers within the meshing diameter is comprised between 1 and 2 times a radius of each emission circle of a first transducer preferably comprised between 1.5 and 2 times the radius, for example 1.73 times the radius.

A second subject matter of the invention is a method for detecting faults of a structure, by means of a device as previously described, a meshing consisting of a plurality of mesh cells and defined by the plurality of transducers having been previously positioned on or in the structure, the method comprising the steps consisting of:
- extracting, depending on the excitation signals emitted by the first transducers and on the reception signals received by the second transducers, a signature for each of the mesh cells,
- comparing the signatures to one another to identify, among the mesh cells, at least one mesh cell as localizing a fault of the structure, called a faulty mesh cell, when the signature of this mesh cell is different from several other signatures of several other mesh cells, the extraction and comparison steps being implemented by the calculation unit.

The method according to the invention can additionally comprise the following features, taken alone or in combination:
- the faulty mesh cell is identified as having a signature which is different from the signatures, which are equal to one another, of at least two other mesh cells, each independently adjacent to the faulty mesh cell,
- a first function of identifying a group defined by, successively, a first mesh cell, a second mesh cell and a third mesh cell, is also defined by the fact that:
  - the first mesh cell, the second mesh cell and the third mesh cell are identified as non-faulty mesh cells, when the signatures of these mesh cells are equal,
  - when the signature of the first mesh cell is different from the signature of the second mesh cell equal to the signature of the third mesh cell, the first mesh cell is identified as a faulty mesh cell,
  - when the signature of the first mesh cell is equal to the signature of the second mesh cell and is different from the signature of the third mesh cell, the first mesh cell is identified as a non-faulty mesh cell and the third mesh cell is identified as a suspect mesh cell,
  - in a first identification sub-step, the first identification function is applied to a first group of three mesh cells, comprising successively a first mesh cell, a second mesh cell, which is adjacent to the first mesh cell, and a third mesh cell, which is adjacent to the first mesh cell,
  - in a second identification sub-step subsequent to the first identification sub-step, the first identification function is applied to another group of mesh cells defined by successively a starting mesh cell formed by the second mesh cell and:
    - the first mesh cell, if the first mesh cell has been identified as a non-faulty mesh cell, and a fourth mesh cell, which is adjacent to the starting mesh cell,
    - a fifth mesh cell, which is adjacent or non-adjacent to the first mesh cell, if the first mesh cell has been identified as a faulty mesh cell, and the fourth mesh cell, which is adjacent to the starting mesh cell,
  - the second identification sub-step is reiterated one or more times on respectively one or more other groups of mesh cells,
  - the starting mesh cell of each second identification sub-step is adjacent to the starting mesh cell of the second identification sub-step preceding it,
  - the fourth mesh cell and the fifth mesh cell are different from the third mesh cell, which is identified as a suspect mesh cell,
  - the mesh cells of each group are other than a mesh cell having been identified as a faulty mesh cell,
  - for the third mesh cell, which is identified as a suspect mesh cell, a second identification function is applied, defined by the fact that:
    - when the signature of the third mesh cell is different from the signature of the first mesh cell, equal to the signature of a sixth mesh cell adjacent to the third mesh cell, the third mesh cell is identified as a faulty mesh cell,
    - when the signature of the third mesh cell is different from the signature of the first mesh cell different from the signature of the sixth mesh cell, the third mesh cell is identified as a faulty mesh cell and the sixth mesh cell is identified as a suspect mesh cell,
    - when the signature of the third mesh cell is equal to the signature of the sixth mesh cell, a first indication signal is sent to a human-machine interface,
- during at least one classification sub-step, the mesh cells having the same signature are classified in a same respective family:
  - the mesh cells which are classified in the respective family having the greatest number of mesh cells, called the healthy family, being identified as non-faulty mesh cells,
  - each mesh cell which is classified in a respective family having only a single mesh cell, called a respective faulty family, being identified as a faulty mesh cell,
- to classify the mesh cells:
  - a first mesh cell having a first signature is classified in a first family, to which is attributed a respective reference equal to the first signature,
  - then successively for each other mesh cell different from the first mesh cell, the classification sub-step is iterated, according to which:
    - the signature of the other mesh cell is compared to the respective reference of each family,
    - if the signature of the other mesh cell is equal to the respective reference of one of the families, then this other mesh cell is classified in this family,
    - if the signature of the other mesh cell is not equal to any respective reference of the families, then this other mesh cell is classified in a new family, to which is attributed a respective reference equal to the signature of this other mesh cell, and
- for each mesh cell belonging neither to the healthy family, nor to the respective faulty family(ies), called the mesh cell to be analyzed, a first distance is calculated between the signature of the mesh cell to be analyzed and the signature of the mesh cells of the healthy family, and a respective second distance between the signature of the mesh cell to be analyzed and the signature of the mesh cells of each respective faulty family is calculated, to:
  - when the first distance is less than each respective second distance, classify the mesh cell to be analyzed in the healthy family or identify the mesh cell to be analyzed as a non-faulty mesh cell, when the first distance is greater than one or more respective second distances, classify the mesh cell to be analyzed in the faulty family having this respective second distance, or identify the mesh cell to be analyzed as a faulty mesh cell.

RAPID DESCRIPTION OF THE FIGURES

The invention will be better understood upon reading the description that follows, given solely by way of a non-limiting example, with reference to the appended drawings, in which:

FIG. 1 shows schematically a modular block diagram of a device for detecting faults according to one embodiment of the invention, FIG. 2 shows schematically an example of an installation of transducers of the method and device for detecting faults in a zone of the structure to be monitored of a first type, according to one embodiment of the invention, FIG. 3 shows schematically an example of an installation of transducers of the method and device for detecting faults in a zone of a structure to be monitored of a second type, according to one embodiment of the invention, FIG. 4 illustrates schematically the overlap between two transducer emission circles, FIG. 5 illustrates schematically a first example of meshing a structure by transducers of the method and device for detecting faults according to one embodiment of the invention, FIG. 6 shows schematically a second example of meshing a structure by transducers of the method and device for detecting faults according to one embodiment of the invention, FIG. 7 shows schematically a third example of meshing a structure by transducers of the method and device for detecting faults according to an embodiment of the invention, FIG. 8 shows schematically a flowchart of a first implementation mode of the method of detecting faults according to the invention, FIG. 9 shows schematically a flowchart of a second embodiment of the method of detecting faults according to the invention, FIG. 10 shows schematically the structure of a matrix of measurements, which can be used according to one implementation mode of the method of detecting faults according to the invention, FIG. 11 shows schematically a schematic flowchart, illustrating the principle of calculation of a fault indicator, which can be used according to one implementation mode of the method of detecting faults according to the invention, FIG. 12 shows schematically an example of fault detection results, indicating in the abscissa a test number, and in the ordinates the value of a fault indicator according to FIG. 11, which can be used according to an implementation mode of the method of detecting faults according to the invention.

DETAILED DESCRIPTION OF THE INVENTION

In FIGS. 1 to 6, the method for detecting faults of a structure and the device 11 for detecting faults of a structure according to the invention use a plurality of transducers 100 or sensors 100, which are positioned on or in a structure STR, for the purpose of detecting and locating its possible faults. The device 11 according to the invention can be a system for diagnosing the condition of the structure. The method according to the invention can be a method for diagnosing the condition of the structure. The structure STR can be of any type of material, being able for example to be composite (for example composites of the monolithic and/or composite of sandwich type and/or with alveolus which can be honeycomb shaped or otherwise). The structure STR can be a portion of an aircraft, such as for example a portion of airplane turbomachines, such as for example airplane turbojets or airplane turboprops or a portion of a thrust reverser (nacelle). The method and the device 11 according to the invention can be used directly on a portion of the aircraft itself, the structure STR then being positioned permanently in the aircraft. The method and the device 11 according to the invention can also be used on a portion of the aircraft, having been removed from it. The invention can be applied to a structure of the IFS (or "internal fixed structure") type of a nacelle of an airplane turbomachine or other, this structure consisting of composite materials of the monolithic and sandwich types, but it can be extended to any other structure of the airplane.

The transducers 100 can be of any type, for example of the ultrasonic or other type (for example of the piezoelectric or other type, particularly of the PZT type, i.e. made of lead zirconate titanate) or other, for example of the optical type (for example by comprising one or more Bragg grating(s) of one or more optical fiber(s)). Preferably, within the scope of the invention, the plurality of transducers 100 is distributed between the first transducers E capable of being in an emission mode (also called excitation mode) on the one hand, and on the other hand second transducers R capable of existing in a reception mode. When a transducer 100 is in the emission mode, this first transducer E emits a predetermined excitation signal. When a transducer 100 is in the reception mode, this second transducer R receives a reception signal in response to the excitation signal emitted by a first transducer E. The excitation signals and the reception signals are capable of propagating through the structure STR, for example along the structure STR or in the structure STR, for example along a surface SUR of the structure STR. When the excitation signal emitted by a first transducer E does not encounter faults in the structure STR, the reception signal received by a second transducer corresponds to this excitation signal or is equal to this excitation signal. When the excitation signal emitted by a first transducer E encounters one or more faults in the structure STR, the reception signal received by second transducer R does not correspond to this excitation signal and is perturbed relative to this excitation signal. Advantageously, the first transducers E are of the ultrasonic type (for example of the piezoelectric or other type, particularly of the PZT type, i.e. made of lead zirconate titanate), and the second transducers R are of the optical type (for example by comprising one or more Bragg grating(s) of one or more optical fiber(s)).

Each transducer 100 can comprise means 101 for connection to the outside as shown in FIGS. 2 and 3, or be wireless. Also provided with the transducers 100 are power supplies and the electronics necessary to their implementation. These connection means 101 serve to send the control signal and the electrical power supply from an external unit 102 to each transducer 100 and to send the reception signals and/or the excitation signals to this external unit 102, as shown in FIG. 1. This externa unit 102 is for example an electronic module and serves to acquire the signals emanating from the transducers 100. This externa unit 102 can comprise a supervisor the goal of which is to retrieve the measurements (reception signals and excitation signals) accomplished by the transducers 100.

The transducers 100 have known or predetermined positions relative to the structure STR. The transducers 100 can be positioned for example on the same surface SUR of the structure STR, as shown in FIGS. 2 and 3. FIG. 2 shows transducers 100a, 100b positioned on the surface SUR of a structure STR formed from a monolithic composite materials of the type IFS structure mentioned above. FIG. 3 shows transducers 100a, 100b positioned on the surface SUR of a structure STR formed from a sandwich type composite material with honeycomb alveolus of the IFS type structure mentioned above. In FIGS. 2 and 3, the elements 100a correspond to first transducers E of the ultrasonic type (for example of the piezoelectric or other type, particularly of the PZT type, i.e. made of lead titanate zirconate), and the elements 100b to second transducers R of the optical type which comprise one or more Bragg grating(s) 100b of one or more optical fiber(s) 105. More precisely, as can be seen in these figures, one or more optical fiber(s) 105 run on, or in the structure STR, and comprise a multitude of Bragg gratings 100b, which are placed so as to serve as second transducers R.

The transducers 100 can also be positioned in the structure STR, for example by belonging to a surface SUR buried in the interior of the structure STR. The surface SUR can be immaterial, in that it constitutes the geometric location grouping all the positions of the transducers 100. The surface SUR can also be material, for example being constituted of a film applied (for example by gluing) to the structure STR, or buried in the interior of the structure STR. Alternatively, this material surface SUR can form a layer positioned between two successive sheets of composite materials, before or after autoclaving of said materials. Either way, the surface SUR may not constitute a plane with two dimensions, for example when the surface SUR assumes the particular shape of the structure STR. Nevertheless, it is always possible to project the surface SUR onto a horizontal plane with two dimensions. In fact, when the surface SUR is material, the transducers 100 are first positioned flat on this surface (i.e. with two dimensions), before being integrated into the structure STR. The particular positioning of the transducers 100 in the scope of the invention, which will now be described, must therefore be considered to be a positioning on a horizontal plane with two dimensions, regardless of the subsequent position of the surface SUR in space during its integration into the structure STR.

The network formed by the plurality of transducers 100 allows having an optimal analysis coverage of the structure STR, while using a minimal number of transducers 100. The propagation of the excitation signals from a first transducer E is of the wave propagation in a free field type, and omnidirectional. In addition, within the scope of the invention, it is assumed that this propagation is concentric relative to the first transducers E. As each first transducer E emits a mechanical wave which propagates in a uniform manner, the second transducers R are therefore positioned so as to be reachable by at least one transducer 100 in the emission mode. There thus exists an overlap between two adjacent emission circles, as can be seen in FIG. 4. In order to guarantee optimal analysis coverage with a minimal number of transducers 100, in a preferred embodiment of the detection device 11 according to the invention, the surface SUR is covered with a minimal number of emission circles E while still guaranteeing a minimal overlap between two adjacent emission circles E.

In this regard, as can be seen in FIG. 5, the first transducers E are positioned to delimit between themselves several mesh cells M, in a hexagonal meshing. The first transducers E are thus not all mutually aligned. The mesh cells M are adjacent to one another. The mesh cells M have known positions relative to the structure STR. The corners of the mesh cells M are formed by the first transducers E. Each mesh cell M surrounds a zone situated between three non-aligned first transducers E or more than three non-aligned first transducers E. As can be seen in FIG. 5, each mesh cell M is delimited by three non-aligned first transducers E and is therefore triangular. Each mesh cell M can have one, two three mesh cells, or more than three mesh cells which are adjacent to it. The mesh cells M, in one preferred embodiment, are equilateral triangles, so as to form the hexagonal meshing. Each vertex of the equilateral triangular mesh cells M thus corresponds to the position of a first transducer E. For example, in FIG. 5, the ten mesh cells 1, 2, 3, 4, 5, 6, 7, 8, 9, 10, which are equilateral and sequentially adjacent, and which are delimited by a first row R1 of three aligned first transducer E, a second row R2 of four first transducers E aligned with each other and not aligned with the row R1, and a third row R3 of three first transducers E aligned with one another and not aligned with rows R1 and R3 are illustrated by fictive continuous lines between the first transducers E.

Based on this hexagonal meshing of the plurality of first transducers E, different embodiments of positioning the plurality of second transducers R have been illustrated in FIGS. 6 and 7. In FIG. 6, each first transducer E is surrounded by three second transducers R positioned on an emission circle centered on the first transducer E. In FIG. 7 six second transducers R are observed per first transducer E. Advantageously, the distance separating two first transducers E is comprised between 1 and 2 times the radius of the-emission circle, preferably comprised between 1.5 and 2 times this radius, for example 1.73 times this radius.

According to one embodiment of the invention, in a first, measurement acquisition step E1 each first transducer E emits an excitation signal, and the second transducers R which surround it on its emission circle acquire reception signals.

In a second, calculation step E2, subsequent to the first measurement acquisition step E1, a signature S is extracted or determined, based on excitation signals of the first transducers 100 E and the reception signals of the second transducers R, for each of the mesh cells M, for example by a calculation unit 103, connected to an acquisition unit 102. The signatures S can for example be calculated by a signal processing and multivariate analysis tool due to the fact that the signatures S are extracted from measurement matrices, calculated based on the excitation signals and reception signals. In addition, this calculation unit 103 implements the algorithm described below and can be an algorithmic fault detection module. The calculation unit 103 is automatic, such as for example one or more calculator(s) and/or one or more computer(s), and or one or more processor(s) and/or one or more server(s) and/or one or more machine(s) which can be programmed in advance by a pre-recorded computer program. The mesh cells M and/or the position of the mesh cells M relative to the structure STR and/or the position of the transducers 100 and/or the affiliation of the transducers 100 to the mesh cells M are calculated and/or recorded and/or pre-recorded in the calculation unit 103.

In a third, fault identification step E3, subsequent to the second, calculation step E2, the signatures S are compared to one another. One or more mesh cells M are identified among the mesh cells M as localizing a fault of the structure STR, called a faulty mesh cell (cell in the damaged condition), when the signature S or this or these mesh cell(s) is different from several other signatures of several other mesh cells.

According to one embodiment, the mesh cell(s) having been identified as faulty mesh cells, and their known position relative the structure STR, are sent in an indication signal to a human-machine interface 104 to be provided to a user, during a fourth, indication step E4, subsequent to the third, fault identification step E3. Thus the user is supplied the known position of the faulty mesh cells relative to the structure STR and therefore the location of the faults thus detected. The human-machine interface 104 allows for example its use by maintenance teams. The human-machine interface 104 is for example connected to the calculation unit 103.

The device 11 for detecting faults of the structure STR comprises for example the transducers 100, the calculation unit 103, the acquisition unit 102 and the human-machine interface 104. The detection device 11 implements a detection method of detecting faults of the structure STR, particularly due to the calculation unit 103 which implements the extraction E2 and comparison E3 steps.

Described below is a first embodiment, called majority voting, of this comparison during the third, fault identification step E3, with reference to FIG. 8. The faulty mesh cell is identified as having a signature S which is different from the signatures S, which are equal or similar to one another, of at least two other mesh cells. These at least two other mesh cells, independently of one another, are each adjacent to the faulty mesh cell, this for reasons of thermal inertia. The comparison is for example carried out in several groups of three mesh cells or more than three mesh cells, each group being different from the other groups by at least one mesh cell. Each group comprises for example an odd number of mesh cells.

According to one embodiment, considered below are groups of three mesh cells M. According to one embodiment, an identification of the faulty mesh cells is thus applied according to a criterion of 2 out of 3 majority. It is considered that the probability of having two mesh cells having the same fault at the same locations is very small. Of course, each group of mesh cells could have more than three mesh cells M, particularly an odd number of mesh cells. The mesh cells of each group are mutually adjacent.

Each group is defined by, successively, a first mesh cell, a second mesh cell and a third mesh cell, mutually adjacent. Each group therefore has a starting mesh cell, which is the first mesh cell. For example, the case of a group of mutually adjacent mesh cells is the first group G1 of three mesh cells, defined by, successively, the first mesh cell 1, the second mesh cell 2 which is adjacent to the first mesh cell 1, and the third mesh cell 6 which is adjacent to the first mesh cell 1 in FIG. 4 or to the second mesh cell.

A first function of identifying all groups of mesh cells defined by, successively, a first mesh cell, a second mesh cell and a third mesh cell, mutually adjacent, is defined below, by taking the example below of the first group G1. The identifying function can be applied to the first group G1 and to any group of mesh cells other than the first group G1, and therefore to any group of mesh cells which can be other than the mesh cell 1 and/or than the mesh cell 2 and/or of the mesh cell 6 of the first group G1.

The first mesh cell 1, the second mesh cell 2 and the third mesh cell 6 are identified as non-faulty mesh cells 1, 2, 6 by the first identifying function, when the signatures S of these mesh cells 1, 2, 6 are equal.

When the signature S of the first mesh cell 1 is different from the signature S of the second mesh cell 2, which is equal to the signature S of the third mesh cell 6, the first mesh cell 1 is identified by the first identifying function as a faulty mesh cell.

When the signature S of the first mesh cell 1 is equal to the signature S of the second mesh cell 2 and is different from the signature S of the third mesh cell 6, the first mesh cell is identified as an undamaged mesh cell (or mesh cell in good health) and the third mesh cell 6 is identified as a suspect mesh cell by the first identifying function.

The third, identification step E3 can comprise one or more first identification sub-step(s) E31 and one or more second identification sub-step(s) E32.

Thus, in the first identification sub-step E31, the first identification function is applied to the first group G1 of, successively, the mesh cells 1, 2 and 6. This first identification sub-step E31 is therefore carried out for the first group G1 having the mesh cell 1 as its starting mesh cell.

According to one embodiment, in the second identification sub-step E32, subsequent to the first identification sub-step E31, the first identification function is applied to another group G2 of mesh cells having as their starting mesh cell the second mesh cell 2.

For example, this other group G2 of mesh cells is defined by, successively, the second mesh cell 2,
  then the first mesh cell 1, if the first mesh cell 1 has been identified as a non-faulty mesh cell, and a fourth mesh cell 3 which is adjacent to the starting mesh cell (mesh cell 2 in this case),
  then a fifth mesh cell, which is adjacent or non-adjacent to the first mesh cell 1, if the first mesh cell 1 has been identified as a faulty mesh cell, and the fourth mesh cell 3, which is adjacent to the starting mesh cell (mesh cell 2 in this case).

According to one embodiment, the fourth mesh cell 3 and the fifth mesh cell 7 are different from the third mesh cell 6, which is identified as a suspect mesh cell. For example, the first mesh cell 1, the second mesh cell 2, the third mesh cell 6, the fourth mesh cell 3 and the fifth mesh cell 7 are distinct from one another. For example, the fifth mesh cell, in the case where it is not adjacent to the first mesh cell 1, can be mesh cell 7.

According to one embodiment, the second identification sub-step E32 is reiterated one or more times on respectively one or more other groups of mesh cells. The starting mesh cells of the second successive identifications sub-steps E32 can be different from one another.

According to one embodiment, the starting mesh cell of each second identification sub-step E32 is adjacent to the starting mesh cell of the second identification sub-step E32 preceding it. Thus identification is carried out on groups one after the other.

According to one embodiment, the mesh cells of each group are other than a mesh cell having been identified as a faulty mesh cell.

According to one embodiment, for example, the first identification function is applied to another group G3 of mesh cells having as its starting mesh cell the fourth mesh cell 3, adjacent to the second mesh cell 2.

For example, this other group G3 of mesh cells is defined by, successively, the fourth mesh cell,
  a seventh mesh cell, which is adjacent or non-adjacent to the starting mesh cell and which has not been identified as a faulty mesh cell, and an eighth mesh cell, which is adjacent or non-adjacent to the starting mesh cell, a seventh mesh cell, which is adjacent or non-adjacent to the starting mesh cell, if the second mesh cell (2) has been identified as a non-faulty mesh cell, and an eighth mesh cell, which is adjacent or non-adjacent to the staffing mesh cell.

The seventh mesh cell can be adjacent to the starting mesh cell (fourth mesh cell 3) and be the mesh cell 4 or the mesh cell 2, if the mesh cell 2 has not been identified as a faulty mesh cell. The eighth mesh cell can be adjacent to the starting mesh cell (fourth mesh cell 3) and be the mesh cell 8 or the mesh cell 2. One means of making this selection can be that of selecting the two mesh cells which have been used the least during analysis, in order to limit the risk of error.

According to one embodiment, for the third mesh cell 6 or each mesh cell which is identified as a suspect mesh cell, a second identification function defined in the following manner is applied.

When the signature of the third mesh cell 6 or suspect mesh cell is different from the signature of the first mesh cell 1, which is equal to the signature of a sixth mesh cell 7 adjacent to the third mesh cell 6 or suspect mesh cell, the third mesh cell 6 or suspect mesh cell is identified as a faulty mesh cell.

When the signature of the third mesh cell 6 or suspect mesh cell is different from the signature of the first mesh cell 1, which is different from the signature of the sixth mesh cell 7, the third mesh cell 6 or suspect mesh cell is identified as a faulty mesh cell and the sixth mesh cell 7 is identified as a suspect mesh cell.

When the signature of the third mesh cell 6 or suspect mesh cell is equal to the signature of the sixth mesh cell 7, a second indication signal is sent to the human-machine interface 104, for example to ask for a decision by the user, this case occurring rarely, however.

When the suspect mesh cell (6 for example) is adjacent to a mesh cell identified as a faulty mesh cell (1 for example), the second identification sub-step 32, the first identification sub-step E31 and/or the second identification function is applied to another mesh cell (7 for example) adjacent to the suspect mesh cell.

According to one embodiment, the second identification sub-step E32, the first identification function and/or the second identification function is applied so that the starting mesh cell is each of the mesh cells in turn, without being a mesh cell having been identified as a faulty mesh cell.

Described below is a second embodiment, called population classification, of this comparison during the third fault identification step E3, with reference to FIG. 9.

The third identification step E3 can comprise one or more third classification sub-step(s) E33 and one or more fourth classification sub-step(s) E34.

During the third, classification sub-step(s), the mesh cells M having the same signature are classified in the same respective family F.

The mesh cells M, which are classified in the respective family F having the greatest number of mesh cells, called the healthy family, are identified as non-faulty mesh cells.

Each mesh cell M, which is classified in a respective family F having only a single mesh cell M, called a respective faulty family, is identified as a faulty mesh cell.

It is unlikely to have the same type of fault over several mesh cells, and it is therefore considered that the population with the greatest number of individuals is a population of mesh cells in good condition, while it is considered that all the populations having only a single individual are populations of faulty mesh cells.

According to one embodiment, in the phase of constructing populations, each mesh cell of the structure in a family is classified in order to be able to subsequently analyze the families and deduce from them if there are faulty families. Each population is defined by a reference.

According to one embodiment, to classify the mesh cells, a first mesh cell 1 is classified having a first signature S1 in a first family F1, to which is attributed a respective reference equal to the first signature S1. Thus the reference for the first population is defined, the number of individuals in which is equal to 1 (for the first mesh cell 1).

Then successively, for each other mesh cell k (for example mesh cell 2, 3, 4, 5, 6, 7, 8, 9, 10) different from the first mesh cell 1, the fourth classification sub-step E34 described below is iterated.

The signature S2 of the other mesh cell k is compared to the respective reference of each family F (comprising family F1), for example by comparing successively the signature S2 of the other mesh cell k to the respective reference of the families Fj, one after the other.

If the signature S2 of the other mesh cell k is equal to the respective reference of one Fj of the families F, then this other mesh cell k is classified in this family Fj. Thus in this case, the number of individual of this family Fj is incremented by 1. If the signature S2 of the other mesh cell k is not equal to the respective reference of the family Fj, then the comparison of the signature S2 of the other mesh cell k to the respective reference of the following family Fj is carried out, with j incremented by 1.

If the signature S2 of the other mesh cell is not equal to any respective reference of the families F, Fj, then this other mesh cell k is classified in a new family F2, to which is attributed a respective reference equal to the signature of this other mesh cell k. Thus in this case, the number of individuals of the new family F2 is equal to 1.

It is continuing then to the following mesh cell, on which is carried out the fourth classification sub-step E34.

This iteration is performed as long as there are one or more mesh cells not yet classified in a family F.

According to one embodiment, it is determined, by distance calculation, whether the family currently under analysis is closer to the healthy family or to a faulty family.

According to one embodiment, each mesh cell belonging neither to the healthy family nor to the respective faulty family or faulty families, called the mesh cell to be analyzed, is classified in a family to be analyzed.

According to one embodiment, for each mesh cell to be analyzed of the family to be analyzed, a first distance is calculated between the signature of the mesh cell to be analyzed and the signature of the mesh cells of the healthy family, and a respective second distance is calculated between the signature of the mesh cell to be analyzed and the signature of the mesh cells of each respective faulty family.

When the first distance is less than each respective second distance, the mesh cell to be analyzed is classified in the healthy family or the mesh to be analyzed is identified as a non-faulty mesh cell.

When the first distance is greater than one or more respective second distances, the mesh cell to be analyzed is classified in the faulty family having this respective second distance or the mesh to be analyzed is identified as a faulty mesh cell.

According to one embodiment, in SHM the calculated distances are called fault indicators. According to one embodiment, the proposed indicator is calculated by means of an extraction method based on multivariate analysis. The details of calculating this indicator are described hereafter in the present document.

For example, for all families having 2 or more individuals (mesh cells), but which are not the population having the most mesh cells, an indicator is calculated between the principal populations and that having a single individual.

The indication step E4 is then carried out, described below.

Compared to the first embodiment, this second embodiment allows having a limited number of mesh cells having the same fault and therefore mitigating the problem of 2 out of 3 majority voting with 2 faulty mesh cells and one non-faulty mesh cell.

According to one embodiment, an interrogation wavelength (of the excitation signal) is less than the distance between the transducers of a same mesh cell.

Described below is one embodiment of the extraction of characteristics.

Let $Y_s(k) \in \mathbb{R}^{M \times n_y}$, be the matrix emanating from a structural zone considered to be free of faults (see FIG. 10, showing the structure of the measurement matrix):

$$Y_s(k) = \begin{bmatrix} y_{11} & \cdots & y_{1i} & \cdots & y_{1n_y} \\ \cdots & \cdots & \cdots & \cdots & \cdots \\ y_{m1} & \cdots & y_{mi} & \cdots & y_{mn_y} \\ \cdots & \cdots & \cdots & \cdots & \cdots \\ y_{M1} & \cdots & y_{Mi} & \cdots & y_{Mn_y} \end{bmatrix} \quad (1)$$

where:

$n_y$ is the number of sensors or transducers C1, C2, ... Ck, Ck+1, ... Cny instrumented on the zone, M is the number of acquisitions established for interrogating the zone, k is the discreet time.

The definition of the fault-free zone is, in our case, linked either to majority voting or to a greater population density, according to the algorithms previously described.

The extraction of the health status characteristics is accomplished by means of a multivariate analysis method, for example principal component analysis (PCA). This method allows transforming variables linked to one another (called correlated variables) into new variables not correlated with one another, for example according to document [1] Tibaduiza, D. A et al (2015). "Structural damage detection using principal component analysis and damage indices," *Journal of Intelligent Material Systems and Structures*.

Mathematically speaking, PCA is based on a decomposition into eigenvalues and eigenvectors of the measurement matrix (see equation 1), thus allowing obtaining a principal and residual space, defined by the following equations:

$$\Lambda_{\Sigma_y} = \begin{bmatrix} \hat{\Lambda}_{n_r \times n_r} & 0 \\ 0 & \tilde{\Lambda}_{(M-n_r) \times (M-n_r)} \end{bmatrix} \quad (2)$$

$$P = \begin{bmatrix} \hat{P}_{M \times n_r} & \tilde{P}_{M \times (M-n_r)} \end{bmatrix} \quad (3)$$

where:

The matrices $\hat{\Lambda}, \hat{P}$ are called eigenvalue, eigenvector matrices, associated with the principal space.

The matrices $\tilde{\Lambda}, \tilde{P}$ are called eigenvalue, eigenvector matrices associated with the residual space.

Described below is one embodiment of the fault indicator.

Considering now the matrix emanating from another structure zone, considered suspect, and associating with this zone a measurement matrix denoted $Y_u$, constructed in the same manner as the schematic of FIG. 10 and according to equation (1).

A zone considered suspect is a zone having an indicator different from that of the zone considered healthy.

To establish the fault indicator necessary for making decisions regarding the state of health, the matrix $Y_u$ is projected in the PCA model (according to equations (2) and (3)) established in the zone considered to be fault-free. The fault indicator denoted DI is defined by the following equation:

$$E = [Y_u(k)(I - \hat{P}\hat{P}^T)] \quad (4)$$

$$DI_i = E_i E_i^T \quad (5)$$

where i corresponds to the acquisition number established for interrogating the structure.

FIG. 12 illustrates the application of majority voting to the fault indicator. For comparison, we can observe that the indicator originating in zone No. 3 is greater than that originating in zone No. 1 and No. 2, thus indicating that a fault is present in zone No. 3.

Figure 1:
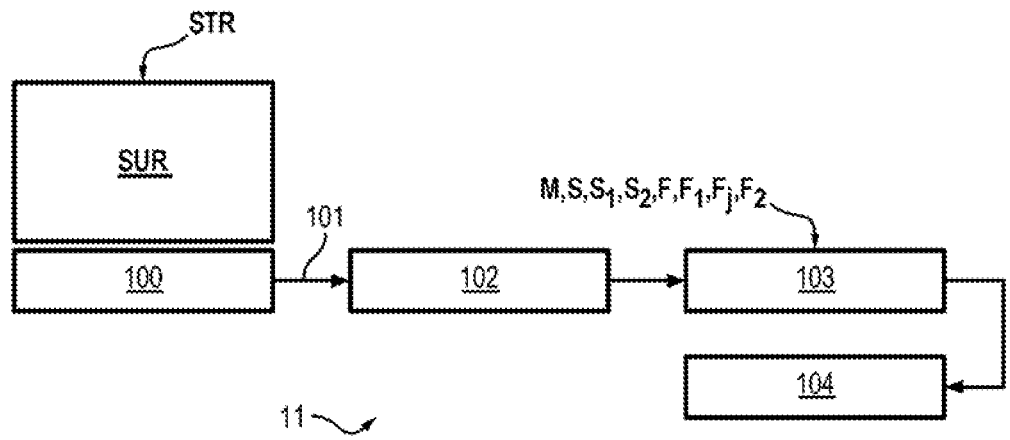
Figure 2:
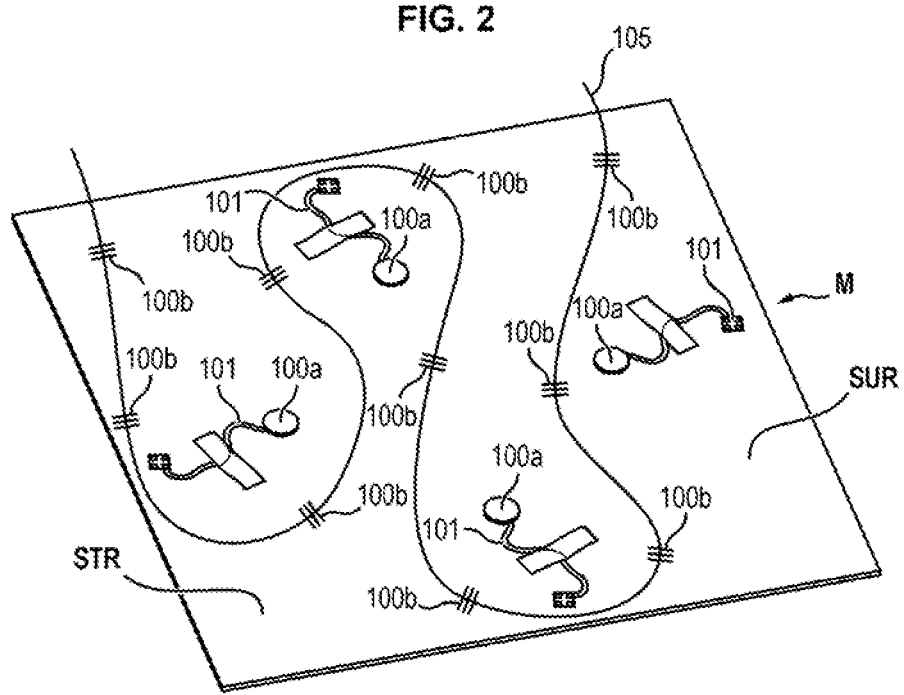
Figure 3:
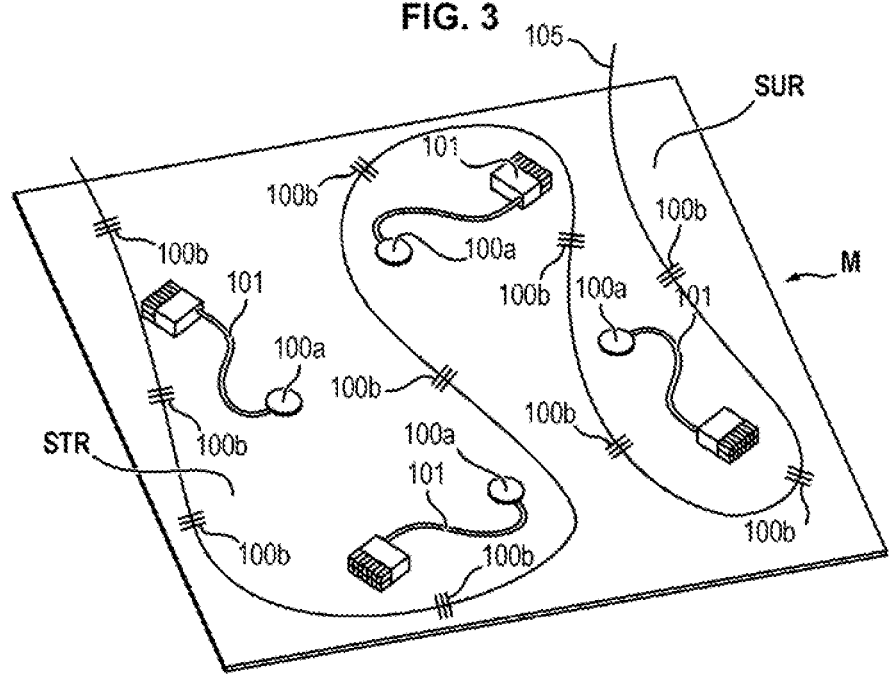
Figure 4:
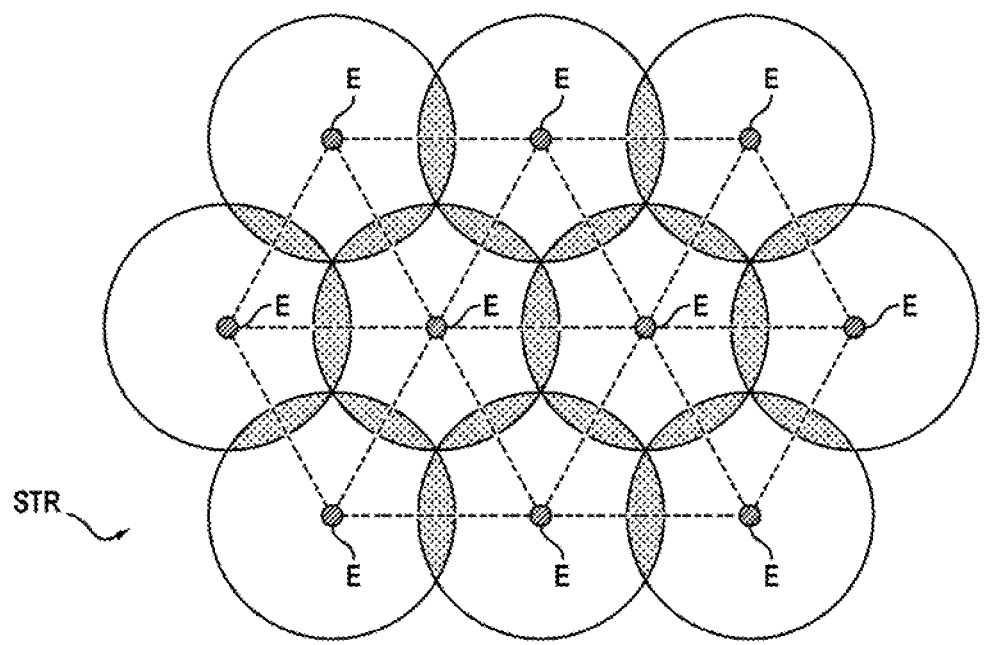
Figure 5:
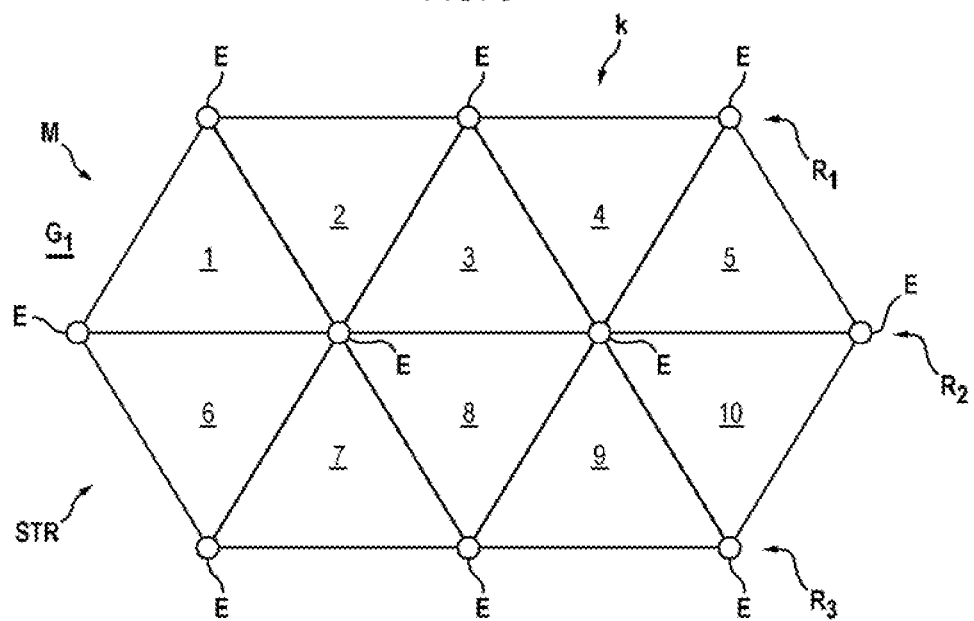
Figure 6:
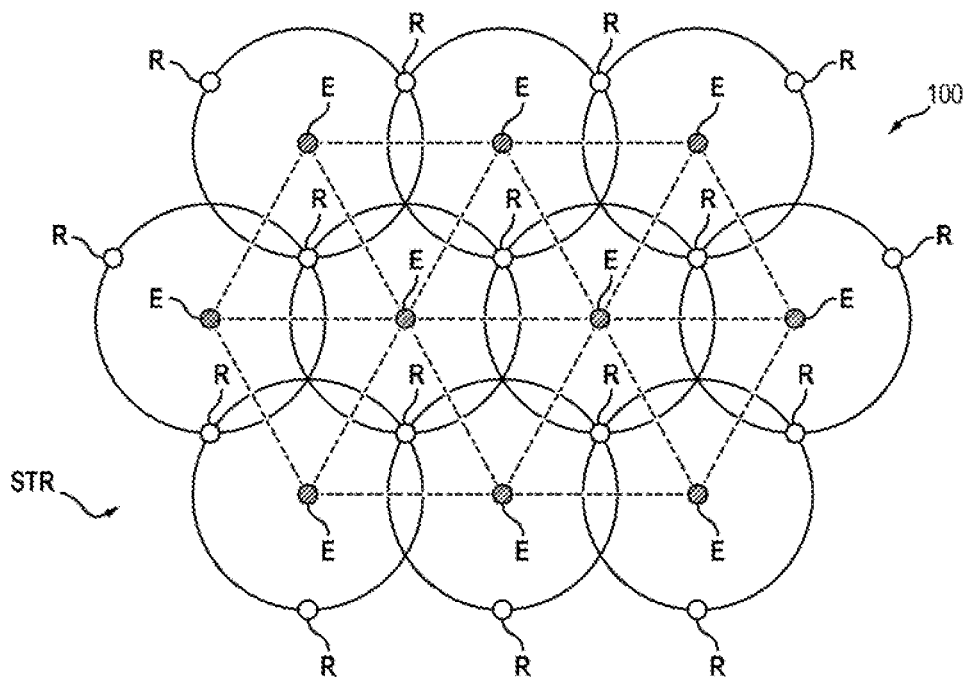
Figure 7:
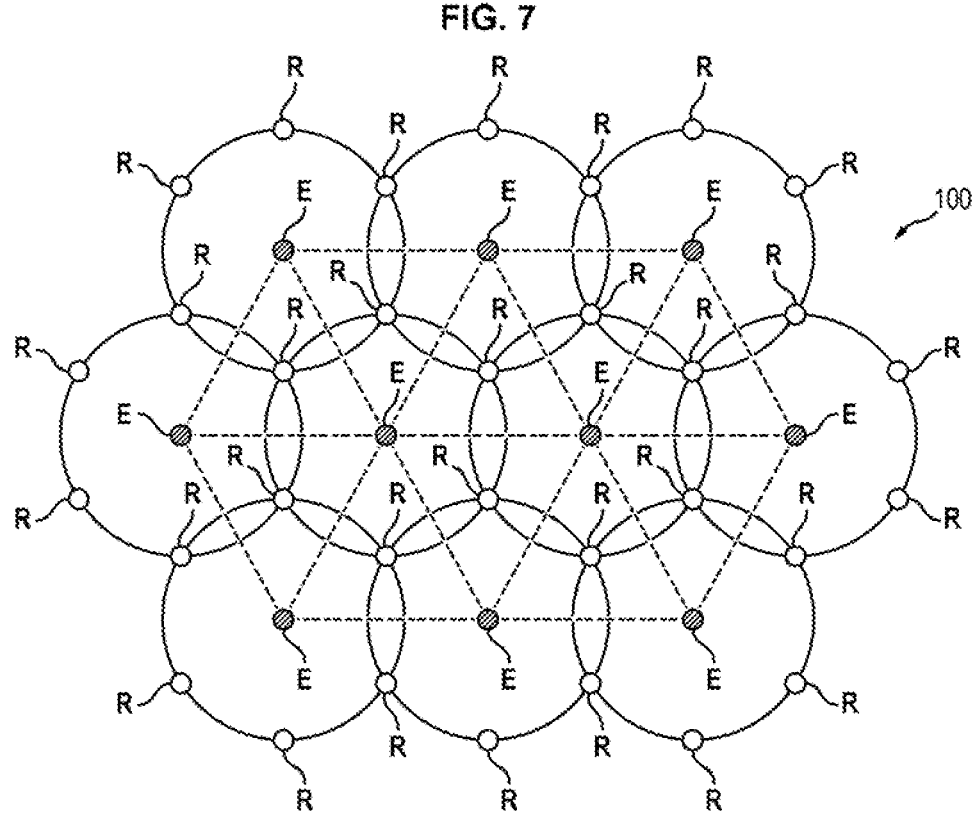
Figure 8:
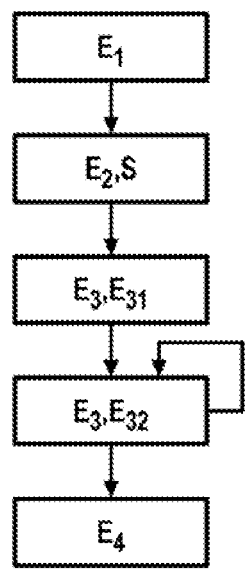
Figure 9:
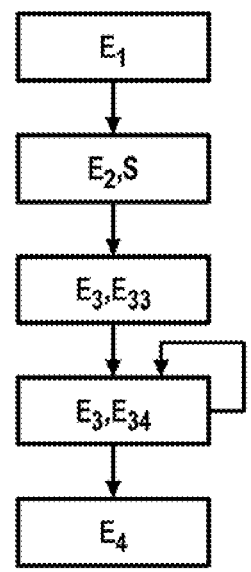
Figure 10:
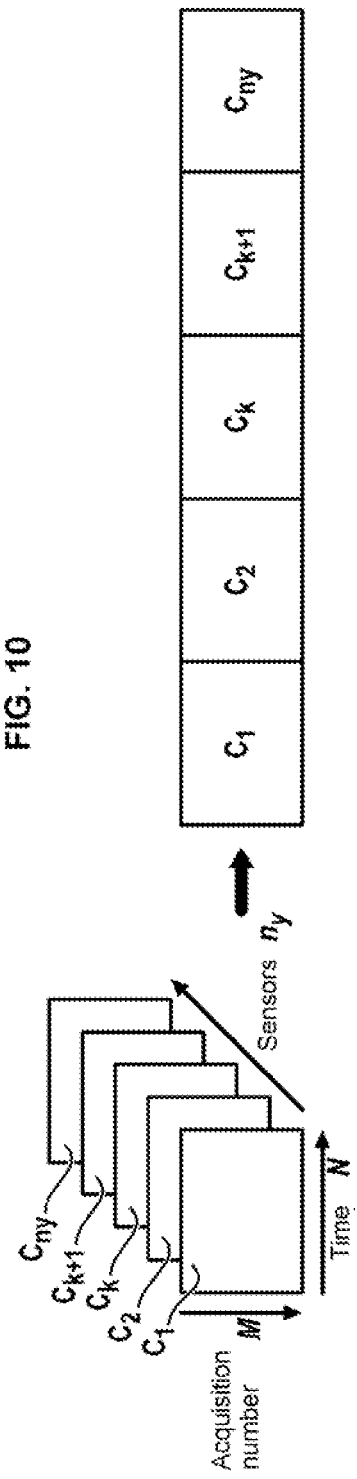
Figure 11:
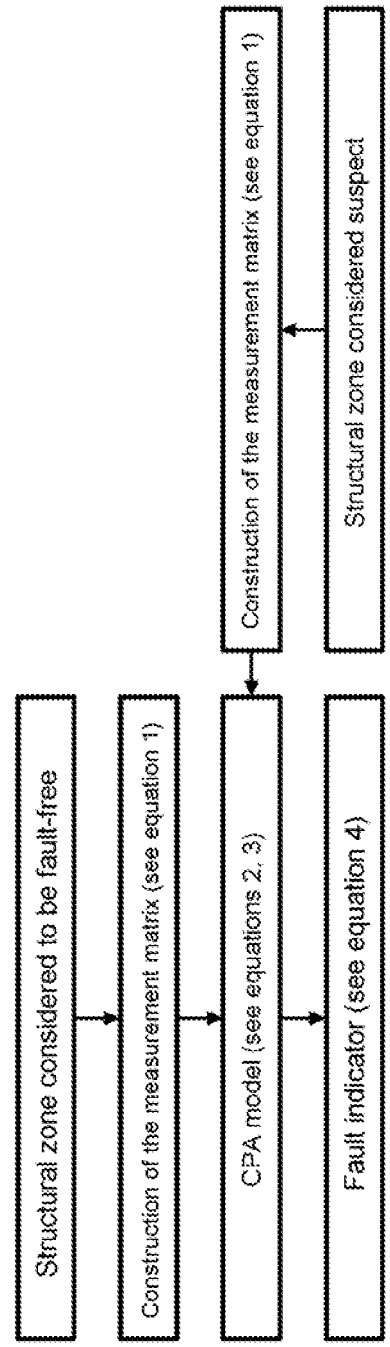
FIG. 11 illustrates a basic diagram of calculation of the fault indicator.

Of course, the embodiments, features and examples above can be combined with one another or be selected independently of one another.

The invention claimed is:

1. A method for detecting faults of a structure, by means of a device for detecting faults of a structure, the device comprising a calculation unit and a plurality of transducers intended to be positioned on or in the structure,
   first transducers of the plurality of transducers being capable of being in an emission mode where they emit an excitation signal,
   second transducers of the plurality of the transducers being capable of being in a reception mode where they receive a reception signal in response to the excitation signal emitted by a first transducer in the emission mode, the excitation signals and the reception signals being capable of propagating along the structure in the structure,
   the first transducers forming a hexagonal meshing so as to delimit between them several mutually adjacent mesh cells,
   the second transducers being positioned on respective emission circles of the first transducers, each emission circle of a first transducer being centered on the first transducer, a meshing consisting of a plurality of mesh cells and defined by the plurality of transducers having been previously positioned on or in the structure, the method comprising the steps consisting of:
   extracting, depending on the excitation signals emitted by the first transducers and on the reception signals received by the second transducers, a signature for each of the mesh cells,
   comparing the signatures to one another to identify, among the mesh cells, at least one mesh cell as localizing a fault of the structure, called a faulty mesh cell, when the signature of this mesh cell is different from several other signatures of several other mesh cells,
   the extraction and comparison steps being implemented by the calculation unit.

2. The method for detecting faults of a structure according to claim 1, wherein the first transducers are piezoelectric sensors, and the second transducers each comprise a Bragg grating of an optical fiber.

3. The method for detecting faults in a structure according to claim 1, wherein the mesh cells are equilateral triangles of which each vertex corresponds to the position of a first transducer, wherein a distance separating two first transducers within the meshing is comprised between 1 and 2 times a radius of the each emission circle of a first transducer preferably comprised between 1.5 and 2 times the radius, for example 1.73 times the radius.

4. The method for detecting faults in a structure according to claim 1, wherein the faulty mesh cell is identified as having a signature which is different from the signatures, which are equal to one another, of at least two other mesh cells, each independently adjacent to the faulty mesh cell.

5. The method for detecting faults in a structure according to claim 1, wherein a first function of identifying a group defined by, successively, a first mesh cell, a second mesh cell and a third mesh cell is also defined by the fact that:
the first mesh cell, the second mesh cell and the third mesh cell are identified as non-faulty mesh cells, when the signatures of these mesh cells are equal,
when the signature of the first mesh cell is different from the signature of the second mesh cell equal to the signature of the third mesh cell, the first mesh cell is identified as a faulty mesh cell,
when the signature of the first mesh cell is equal to the signature of the second mesh cell and is different from the signature of the third mesh cell, the first mesh cell is identified as a non-faulty mesh cell and the third mesh cell is identified as a suspect mesh cell,
in a first identification sub-step, the first identification function is applied to a first group of three mesh cells, comprising successively a first mesh cell, a second mesh cell, which is adjacent to the first mesh cell, and a third mesh cell, which is adjacent to the first mesh cell.

6. The method for detecting faults in a structure according to claim 5, wherein, in a second identification sub-step subsequent to the first identification sub-step, the first identification function is applied to another group of mesh cells defined by successively a starting mesh cell formed by the second mesh cell and:
the first mesh cell, if the first mesh cell has been identified as a non-faulty mesh cell, and a fourth mesh cell, which is adjacent to the starting mesh cell,
a fifth mesh cell, which is adjacent or non-adjacent to the first mesh cell, if the first mesh cell has been identified as a faulty mesh cell and the fourth mesh cell which is adjacent to the starting mesh cell.

7. The method for detecting faults in a structure according to claim 6, wherein the second identification sub-step is reiterated one or more times on respectively one or more other groups of mesh cells.

8. The method for detecting faults in a structure according to claim 7, wherein the starting mesh cell of each second identification sub-step is adjacent to the starting mesh cell of the second identification sub-step preceding it.

9. The method for detecting faults in a structure according to claim 6, wherein the fourth mesh cell and the fifth mesh cell are different from the third mesh cell, which is identified as a suspect mesh cell.

10. The method for detecting faults in a structure according to claim 5, wherein the mesh cells of each group are other than a mesh cell having been identified as a faulty mesh cell.

11. The method for detecting faults in a structure according to claim 5, wherein, for the third mesh cell, which is identified as a suspect mesh cell, a second identification function is applied, defined by the fact that:
when the signature of the third mesh cell is different from the signature of the first mesh cell equal to the signature of a sixth mesh cell adjacent to the third mesh cell, the third mesh cell is identified as a faulty mesh cell,
when the signature of the third mesh cell is different from the signature of the first mesh cell different from the signature of the sixth mesh cell, the third mesh cell is identified as a faulty mesh cell and the sixth mesh cell is identified as a suspect mesh cell,
when the signature of the third mesh cell is equal to the signature of the sixth mesh cell, a first indication signal is sent to a human-machine interface.

12. The method for detecting faults in a structure according to claim 1, wherein, during at least one classification sub-step, the mesh cells having the same signature are classified in a same respective family:
the mesh cells which are classified in the respective family having the greatest number of mesh cells, called the healthy family, being identified as non-faulty mesh cells,
each mesh cell which is classified in a respective family having only a single mesh cell, called a respective faulty family, being identified as a faulty mesh cell.

13. The method for detecting faults in a structure according to claim 12, wherein, to classify the mesh cells:
a first mesh cell having a first signature is classified in a first family, to which is attributed a respective reference equal to the first signature,
then successively for each other mesh cell different from the first mesh cell, the classification sub-step is iterated according to which
the signature of the other mesh cell is compared to the respective reference of each family,
if the signature of the other mesh cell is equal to the respective reference of one of the families, then this other mesh cell is classified in this family,
if the signature of the other mesh cell is not equal to any respective reference of the families, then this other mesh cell is classified in a new family, to which is attributed a respective reference equal to the signature of this other mesh cell.

14. The method for detecting faults in a structure according to claim 12, wherein:
for each mesh cell belonging neither to the healthy family, nor to the respective faulty family(ies), called the mesh cell to be analyzed, a first distance is calculated between the signature of the mesh cell to be analyzed and the signature of the mesh cells of the healthy family, and a respective second distance between the signature of the mesh cell to be analyzed and the signature of the mesh cells of each respective faulty family is calculated to:
when the first distance is less than each respective second distance, classify the mesh cell to be analyzed in the healthy family or identify the mesh cell to be analyzed as a non-faulty mesh cell,
when the first distance is greater than one or more respective second distances, classify the mesh cell to be analyzed in the faulty family having this respective second distance, or identify the mesh cell to be analyzed as a faulty mesh cell.

* * * * *